United States Patent
Mitchell et al.

(10) Patent No.: US 11,053,467 B2
(45) Date of Patent: Jul. 6, 2021

(54) ACCELERATED AGING OF ALCOHOL SPIRITS

(71) Applicant: PB Funding, LLC, Bellevue, WA (US)

(72) Inventors: James B. Mitchell, Seattle, WA (US); Avi R. Geiger, Seattle, WA (US); William H. Mitchell, Medina, WA (US)

(73) Assignee: PB Funding Group, LLC, Bellevue, WA (US)

( * ) Notice: Subject to any disclaimer, the term of this patent is extended or adjusted under 35 U.S.C. 154(b) by 0 days.

(21) Appl. No.: 16/914,380

(22) Filed: Jun. 28, 2020

(65) Prior Publication Data

US 2020/0325427 A1 Oct. 15, 2020

Related U.S. Application Data

(63) Continuation of application No. 16/263,909, filed on Jan. 31, 2019.

(51) Int. Cl.
*C12H 1/22* (2006.01)
*C12G 3/07* (2006.01)
*B01J 3/04* (2006.01)
*B27K 5/00* (2006.01)

(52) U.S. Cl.
CPC ............ *C12H 1/22* (2013.01); *B01J 3/042* (2013.01); *B27K 5/007* (2013.01); *C12G 3/07* (2019.02); *B27K 2240/10* (2013.01)

(58) Field of Classification Search
USPC ..................................... 99/277, 277.1, 277.2
See application file for complete search history.

(56) References Cited

U.S. PATENT DOCUMENTS

| 2,055,060 | A |   | 9/1936  | Barker |
|-----------|---|---|---------|--------|
| 2,114,331 | A |   | 4/1938  | Brown |
| 2,132,435 | A |   | 10/1938 | Reiman |
| 2,145,243 | A | * | 1/1939  | Bagby ..................... C12H 1/00 426/312 |
| 4,073,955 | A |   | 2/1978  | Koppelman |
| 4,210,676 | A |   | 7/1980  | Dudar et al. |
| 4,350,708 | A |   | 9/1982  | Palacios |
| 4,956,194 | A |   | 9/1990  | Gos |
| 4,985,264 | A |   | 1/1991  | Clauzure |
| 4,994,289 | A |   | 2/1991  | Yu |
| 5,860,353 | A |   | 1/1999  | Ceccarani |
| 6,132,788 | A |   | 10/2000 | Zimlich, III |

(Continued)

FOREIGN PATENT DOCUMENTS

WO WO-2018030975 A1 * 2/2018 ............. B01F 3/20

*Primary Examiner* — Ibrahime A Abraham
*Assistant Examiner* — Elizabeth M Sims
(74) *Attorney, Agent, or Firm* — Russell Krajec; Krajec Patent Offices, LLC

(57) ABSTRACT

Alcoholic spirits may be artificially aged under highly pressurized carbon dioxide. The carbon dioxide may form carbonic acid, which may cause various esters to form in the presence of wood as well as to mellow the flavor when no wood is present. Wood may be pretreated with ozone, which may extract lignin which may further convert to vanillin during pressurized $CO_2$ treatment, giving a vanilla note. After processing with pressurized $CO_2$, a post-treatment of ozone may be given to the spirit, which may cause a mild oxidation and further mellowing of the spirit.

10 Claims, 6 Drawing Sheets

(56) References Cited

U.S. PATENT DOCUMENTS

| | | |
|---|---|---|
| 6,344,226 B1 | 2/2002 | Zimlich, III |
| 6,506,430 B1 | 1/2003 | Zimlich, III et al. |
| 6,703,060 B1 | 3/2004 | Gross et al. |
| 6,846,503 B2 | 1/2005 | Vickers, Jr. |
| 6,869,630 B2 | 3/2005 | Gross et al. |
| 7,762,179 B2 | 7/2010 | Eustis |
| 8,294,484 B1 | 10/2012 | Thiyagarajan |
| 8,689,678 B2 | 4/2014 | Eustis |
| 9,157,949 B2 | 10/2015 | Thiyagarajan |
| 9,364,012 B2 | 6/2016 | Pellegrini |
| 9,535,044 B2 | 1/2017 | Kim et al. |
| 9,637,712 B2 | 5/2017 | Davis |
| 9,637,713 B2 | 5/2017 | Davis |
| 9,840,687 B2 | 12/2017 | May et al. |
| 9,862,917 B2 | 1/2018 | Chidambarakrishnan et al. |
| 9,944,891 B2 | 4/2018 | Chidambarakrishnan et al. |
| 10,041,027 B2 | 8/2018 | Evans et al. |
| 10,052,787 B1 | 8/2018 | Petschke, Jr. |
| 10,184,098 B2 | 1/2019 | Janssen |
| 10,196,595 B2 | 2/2019 | Butte |
| 10,260,032 B1 | 4/2019 | Karasch |
| 10,508,259 B2 | 12/2019 | Davis |
| 10,544,386 B2 | 1/2020 | Davis |
| 10,611,990 B1 | 4/2020 | Azzaretto et al. |
| 10,633,620 B2 | 4/2020 | DeCaro et al. |
| 10,718,727 B2 | 7/2020 | Grabau et al. |
| 2001/0018086 A1 | 8/2001 | Gross et al. |
| 2002/0168446 A1 | 11/2002 | Zimlich et al. |
| 2004/0028588 A1 | 2/2004 | Webb et al. |
| 2005/0042337 A1* | 2/2005 | Tarlow ............ B65D 81/18 426/106 |
| 2006/0216383 A1 | 9/2006 | Kolodziejak et al. |
| 2008/0000356 A1 | 1/2008 | Eustis |
| 2010/0129490 A1* | 5/2010 | Williams ............ C12C 11/006 426/11 |
| 2010/0288130 A1 | 11/2010 | Eustis |
| 2011/0070330 A1 | 3/2011 | Watson et al. |
| 2011/0070331 A1 | 3/2011 | Watson et al. |
| 2011/0129589 A1 | 6/2011 | Watson et al. |
| 2012/0040216 A1* | 2/2012 | Parakulam ............ H01M 8/20 429/61 |
| 2012/0164300 A1 | 6/2012 | Niazi |
| 2014/0314930 A1 | 10/2014 | Nassief |
| 2014/0342370 A1 | 11/2014 | Wang |
| 2015/0088434 A1 | 3/2015 | Grabau et al. |
| 2015/0093491 A1 | 4/2015 | Pellegrini |
| 2015/0184117 A1 | 7/2015 | Stites et al. |
| 2015/0197716 A1 | 7/2015 | Davis |
| 2015/0337248 A1 | 11/2015 | Davis |
| 2016/0040106 A1 | 2/2016 | May et al. |
| 2016/0097023 A1 | 4/2016 | Peniche |
| 2016/0289619 A1 | 10/2016 | Mancosky |
| 2016/0348046 A1* | 12/2016 | Wood ............ C12H 1/22 |
| 2016/0355771 A1 | 12/2016 | Davis |
| 2017/0036974 A1 | 2/2017 | Peterson et al. |
| 2017/0060581 A1 | 3/2017 | Patil |
| 2017/0165618 A1 | 6/2017 | Johansson |
| 2017/0233688 A1 | 8/2017 | Davis |
| 2017/0292100 A1 | 10/2017 | Butte |
| 2018/0037859 A1 | 2/2018 | Janssen |
| 2018/0051240 A1 | 2/2018 | Au |
| 2018/0057780 A1* | 3/2018 | DeCaro ............ A23L 2/56 |
| 2018/0119076 A1 | 5/2018 | Evans et al. |
| 2018/0142192 A1 | 5/2018 | Ingram, III |
| 2018/0245030 A1 | 8/2018 | Mancosky |
| 2018/0305649 A1 | 10/2018 | Hall et al. |
| 2018/0320118 A1 | 11/2018 | Mancosky |
| 2018/0320119 A1 | 11/2018 | Evans et al. |
| 2018/0346855 A1 | 12/2018 | Davis |
| 2019/0292501 A1 | 9/2019 | Berglund et al. |
| 2020/0010785 A1* | 1/2020 | Monahan ............ C12H 1/22 |
| 2020/0017810 A1 | 1/2020 | Hoch et al. |
| 2020/0056132 A1 | 2/2020 | Spooner |
| 2020/0056133 A1 | 2/2020 | Grime et al. |
| 2020/0080039 A1 | 3/2020 | Ingram, III |
| 2020/0123481 A1 | 4/2020 | Davis |
| 2020/0156834 A1 | 5/2020 | Exley |
| 2020/0248113 A1 | 8/2020 | Mitchell et al. |
| 2020/0255777 A1 | 8/2020 | Fearnside et al. |
| 2020/0325426 A1 | 10/2020 | Botner |
| 2020/0325427 A1 | 10/2020 | Mitchell et al. |

* cited by examiner

ARTIFICIAL AGING OF DISTILLED SPIRITS

ACCELERATED AGING OF ALCOHOL SPIRITS

CROSS REFERENCE TO RELATED APPLICATIONS

This application is a continuation of and claims priority to and benefit of U.S. patent application Ser. No. 16/263,909, "Accelerated Aging of Alcohol Spirits" filed 31 Jan. 2019.

BACKGROUND

Whiskey is an age old spirit that has been distilled and aged for centuries. Alcohol is distilled, then placed in charred wooden casks for aging. Over time, the alcohol absorbs the color and flavor of the burned wood, as well as mellowing. The wooden casks "breathe" to some extent, and some alcohol evaporates over time.

The aging process often takes years to accomplish, with the finest whiskies having been aged for 10 years, 20 years, or even longer.

SUMMARY

Alcoholic spirits may be artificially aged under highly pressurized carbon dioxide. The carbon dioxide may form carbonic acid, which may cause various esters to form in the presence of wood as well as to mellow the flavor when no wood is present. Wood may be pretreated with ozone, which may extract lignin which may further convert to vanillin during pressurized CO2 treatment, giving a vanilla note. After processing with pressurized CO2, a post-treatment of ozone may be given to the spirit, which may cause a mild oxidation and further mellowing of the spirit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Accelerated Aging of Alcoholic Spirits

Figure 1:
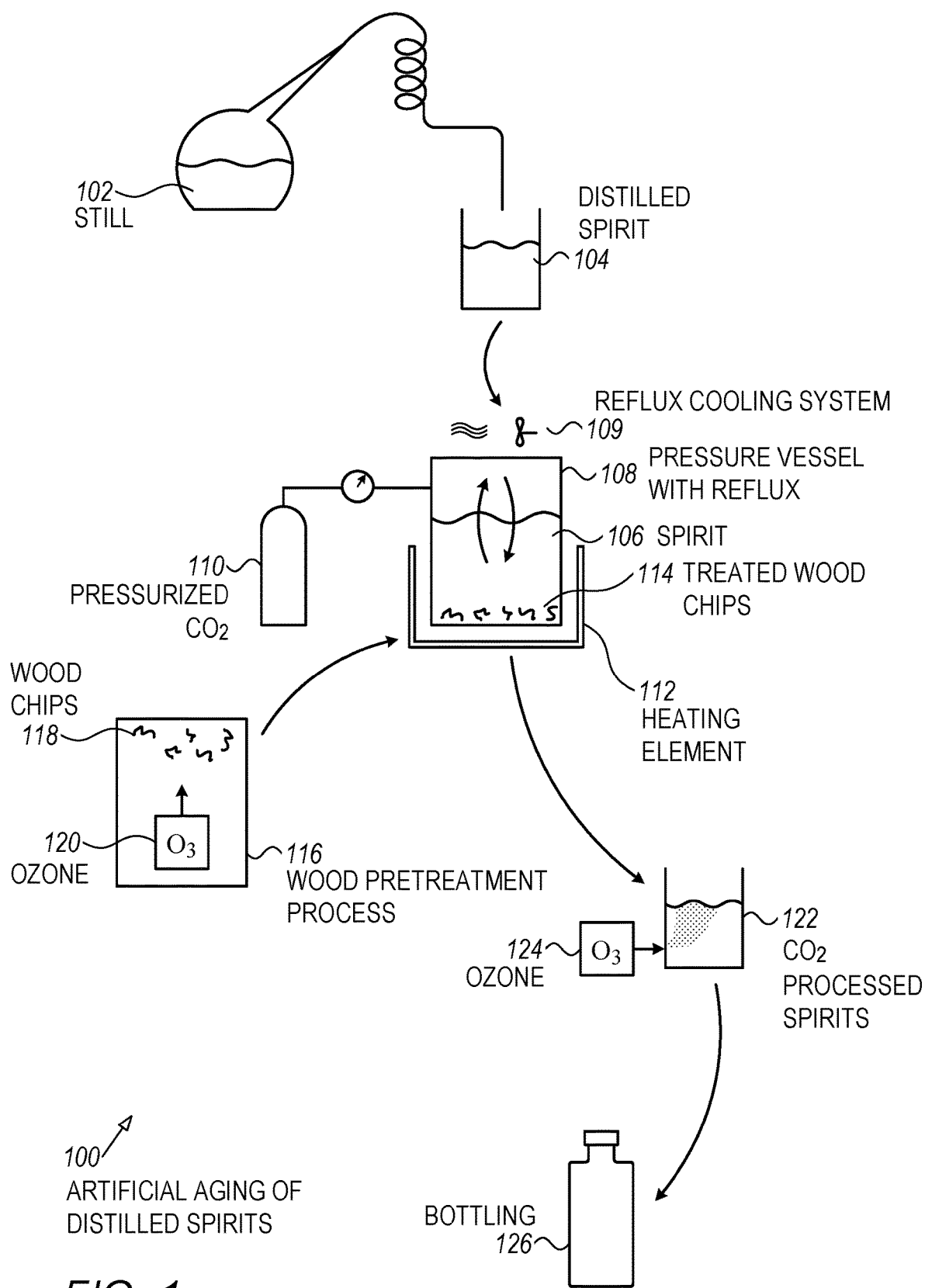
FIG. 1 is a diagram illustration of an embodiment showing processes that may accelerate aging of alcohol spirits.

Alcoholic spirits may undergo artificial accelerated aging using several processes that may mimic years of barrel aging. The raw alcoholic spirit may be pressurized with CO2, which may cause carbonic acid to form, which may accelerate the aging process. Ozone may be applied to wood shavings or charred wood shavings to accelerate the oxidation of the wood, thereby bringing in tannins, vanillin, and other wood characteristics. Ozone may also be applied post-aging to further enhance mellowing of the spirit.

During barrel aging, a spirit, such as whiskey, may undergo several processes that may be artificially simulated to accelerate aging. One process may be to form carboxylic acids that may form various esters in the presence of alcohol. In barrel aging, the carboxylic acids may be slowly infused into the alcohol by long term storage in wooden barrels.

The formation of carboxylic acids may be artificially accelerated by placing the alcohol under high pressure carbon dioxide, where the carboxylic acid carbonic acid may be formed. Pressures of 50 psi have been found to be effective, and pressures of 30, 40, 60, 80, and 100 psi have also been found to be effective.

A vessel with pressurized carbon dioxide may be configured with a heat source near the bottom and a cooling fan or other cooling device at the top to create a reflux condition in the vessel. Temperatures of 80-85F have been suitable, although some cases 125F has been applied with success. Temperatures in the range of 70, 80, 90, 100, 120, 130, 140, and 150F have been tested with some success. In general, a higher temperature pressurization process is performed with a correspondingly high pressurization.

In a pressurized carbon dioxide process for accelerated aging, considerable taste difference may be accomplished in less than an hour. In some cases, pressurized carbon dioxide treatment may be applied for several hours, days, or even weeks or months. During empirical tests, pressurized carbon dioxide treatment as described above at 50 psi and 80F over three days appears to simulate about 2 years of aging.

A second process of aging is the extraction of various tannins from charred wood. In classic barrel aging, tannins, lignin, and other molecules are slowly extracted from the charred wood. These molecules react with carboxylic acids to create flavors in the spirit.

The extraction of compounds and molecules from the wood may be accelerated by treating the wood with ozone. Ozone may cause the natural oxidation process to occur with accelerated results. A treatment of 3-30 minutes on charred or toasted wood chips with gaseous ozone has produced wood chips that readily give off flavor components when processed under pressurized carbon dioxide.

In many cases, a spirit may benefit from contact with ozone-treated wood for a period of time with pressurized carbon dioxide, then further processing under pressurized carbon dioxide without the wood present. Such a sequence may extract various compounds from the wood, then further mellow the spirit with additional carbon dioxide treatment.

A direct treatment of a processed spirit with ozone may further accelerate mellowing. After processing a spirit with pressurized carbon dioxide, a small amount of gaseous ozone may be passed through the spirit to cause a final mellowing.

One mechanism to accomplish an accelerated aging treatment of alcohol may be a device that may have a vessel to hold the spirit at a pressure. In some cases, a separate container may contain wood shavings, chips, or other pieces of wood. The mechanism may pressurize the spirit, apply heat to the spirit, and may circulate the spirit through the container with wood chips. After a predetermined time, the spirit may cease circulation through the wood chip container and may undergo further pressurized processing without the wood chips. In some cases, the mechanism may further apply ozone to the processes spirit prior to dispensing and bottling.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an example embodiment 100 showing a process for accelerated aging of alcoholic spirits. Embodiment 100 illustrates several processes that may be combined to artificially replicate processes that may take years of aging in wooden casks, and reduce the processing time to a matter of minutes, hours, days, or weeks.

A still 102 may produce a distilled spirit 104. Common distilled spirits include vodka, bourbon, rye, whiskey, brandy, gin, rum, tequila, mescal, baijiu, absinthe, and others. In many cases, such spirits may be aged, which may impart different colors and tastes to the spirit, as well as mellow the harshness that newly distilled alcoholic beverages may have.

An accelerated aging process may place the spirit 106 into a pressure vessel 108, then pressurize the vessel with pressurized carbon dioxide 110. The pressurized carbon dioxide may form a carboxylic acid, specifically carbolic acid, which may simulate natural carboxylic acids and the reactions that occur slowly during natural aging.

The carbon dioxide pressure may be set to 30 psi or higher. Satisfactory results have been obtained at 40 psi, 50 psi, 60 psi, 70 psi, 80 psi, 100 psi, 120 psi, 140 psi, and 160 psi.

The pressure vessel 108 may have a heating element 112 and a reflux cooling system 109. The combination of a heating element 112 and a reflux cooling system 109 may cause some evaporation from the liquid, then condensation at the top of the vessel.

The heating element 112 may be any type of heating mechanism. In some cases, a pressure vessel may be stored in a temperature controlled environment, while in other cases, a heating element may be placed inside or outside the pressure vessel. The heating mechanism may use any type of heat source, such as electric, gas, steam, or other heat source. In some cases, the heating mechanism may be a heating system that liquid recirculates through a heating element or heat exchanger.

The heating element 112 may maintain the contents of a pressure vessel at a specific temperature, such as 80F. In different applications, satisfactory results have been obtained at 90F, 100F, 110F, 120F, 130F, 140F, and 150F or higher. In many cases, the combination of pressure and temperature may be related. In other words, a higher pressure of carbon dioxide may allow for a higher temperature of processing.

The spirit 106 may come into contact with treated wood chips 114. In the illustration, the wood chips 114 are illustrated as being inside the pressure vessel 108. In other embodiments, the wood chips may be placed in a separate containment vessel, which may be pressurized to the same pressure as the pressure vessel 108. In such embodiments, a recirculating system, such as a pump and a series of valves, may cause the spirit 106 to come in contact with the wood chips 114, but may allow for the wood chips to be removed from recirculation.

Some systems may process a spirit with wood chips present for a period of time, then remove the wood chips to continue processing the spirit 106 while still under pressurized carbon dioxide. Such systems have been found to be effective at further mellowing the spirit without extracting too much from the wood chips 114.

The treated wood chips 114 may be pre-treated with ozone. A wood pre-treatment process 116 may have an ozone generator 120 which may apply gaseous ozone to wood pieces. The wood pieces may be raw wood or wood that may have been burned, charred, or toasted. The ozone treatment may be a gaseous ozone that may be applied to the wood pieces for a period of time, from a handful of seconds to minutes, hours, or even longer.

The wood chips may be wood in any form. In some cases, the wood may be previously used barrel staves that may be cut into suitable pieces for processing. The wood pieces may be thin shavings, rough cut chips, longer pieces, or other sizes.

The size of the equipment being used may affect the size and configuration of wood pieces. For smaller systems that may process small amounts of spirits, such as those that may process pint, quart, or small number of gallons of spirits, the wood pieces may be smaller. For larger systems that may process tens, hundreds, or even larger number of gallons, the wood pieces may be much larger.

The ozone treatment may oxidize various compounds in the wood, which may aid extraction into the alcohol spirit. It is believed that the presence of carbonic acid from the pressurized carbon dioxide may further enhance the conversion of the wood compounds into flavor components of the spirit. For example, lignin from the wood may be converted into vanillin, which may impart a vanilla flavor to the spirit.

After processing in the pressure vessel 108, the spirit may be degassed. Such a process may involve ultrasonic vibration, mechanical agitation, or other mechanisms by which dissolved carbon dioxide may be removed.

After processing degassing, the carbon dioxide processed spirits 122 may undergo a treatment with gaseous ozone 124. The ozone 124 may further enhance the mellowness of a spirit. After the ozone treatment, the accelerated-aged spirit may be bottled 126 and consumed.

Figure 2:
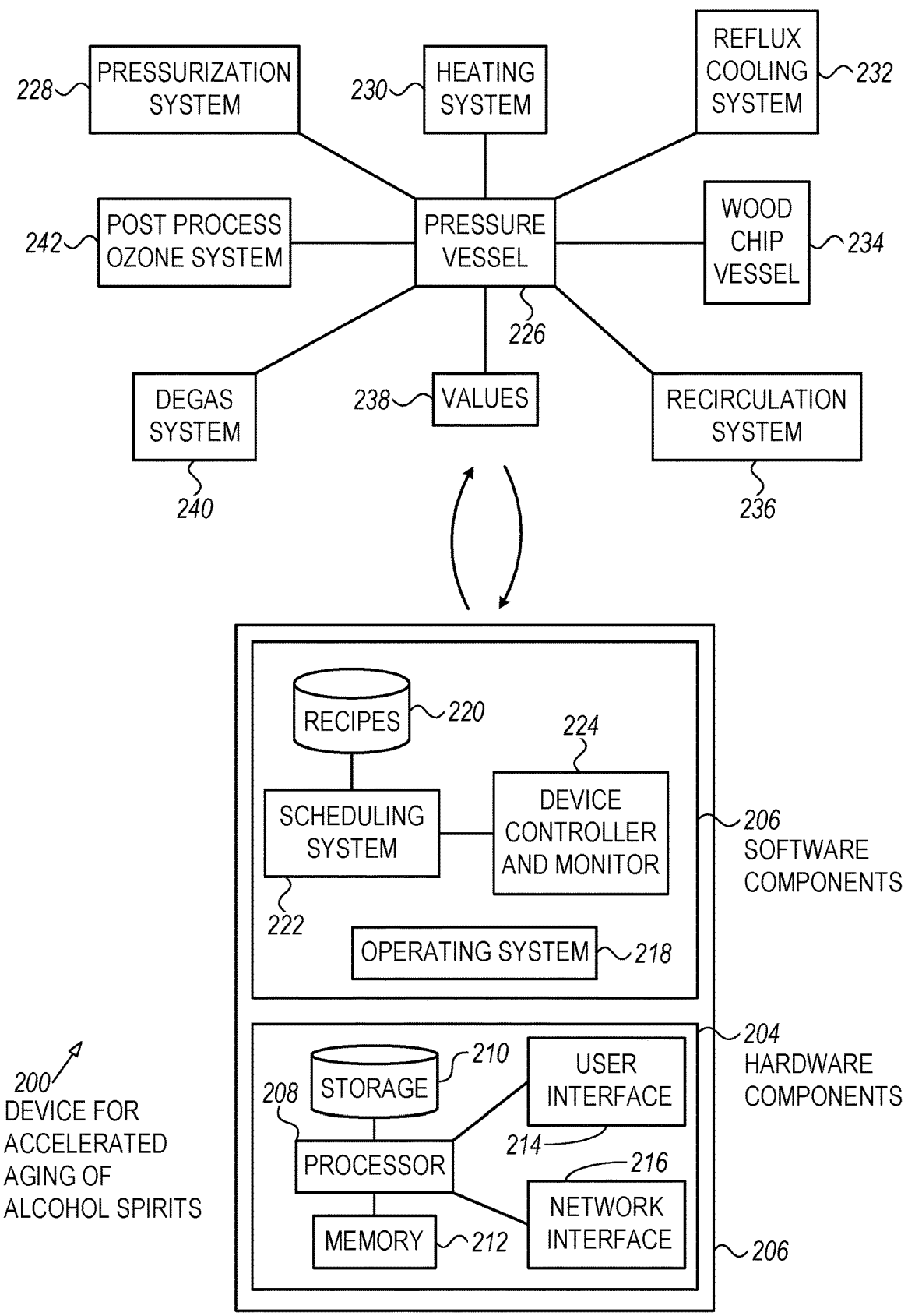
FIG. 2 is a diagram illustration of an embodiment showing a schematic or functional representation of a machine for accelerated aging of alcohol spirits

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A library of recipes 220 may define the processing parameters for different spirits. Some spirits may undergo different recipes to achieve different flavor profiles. In many cases, a person may test and refine recipes to achieve specific flavors and tastes. Such recipes may be stored in the library of recipes 220.

A scheduling system 222 may control when recipes are executed, while a device controller and monitor 224 may operate the hardware devices and cause the functions to occur at specific times.

A pressure vessel 226 may have a pressurization system 228 attached. The pressure vessel 226 may contain a spirit during processing. In some systems, several pressure vessels or non-pressurized vessels may be used at different points in the process.

The pressurization system 228 may pressurize the contents of the pressure vessel 226 with carbon dioxide. A heating system 230 may apply heat to maintain the contents of the pressure vessel 226 at a constant temperature, while a reflux cooling system 232 may cool the top portion of the pressure vessel.

With a heated lower portion and a cooled upper portion, the pressure vessel 226 may establish a reflux dynamic, where alcohol may evaporate from the lower portion and condense in the upper portion. The cooling system 232 may be any type of cooling system, from a simple fan or evaporative cooling system, to a more sophisticated cooling system.

Some systems may have a separate wood chip vessel 234, which may hold wood chips during the pressurized processing. In other systems, wood chips may be placed in the pressure vessel 226. A recirculating system 236 and a series of valves 238 may cause the spirits in the pressure vessel 226 to circulate through the wood chip vessel 234 during processing.

A degas system 240 may remove dissolved carbon dioxide from the spirits after pressurized processing. The degas system 240 may be any mechanism by which carbon dioxide may be removed, such as an ultrasonic vibration system, mechanical agitation, or other mechanism.

After degassing, a post-process ozone treatment system 242 may generate gaseous ozone, which may be passed through the spirits as a final step of artificial aging.

Figure 3:
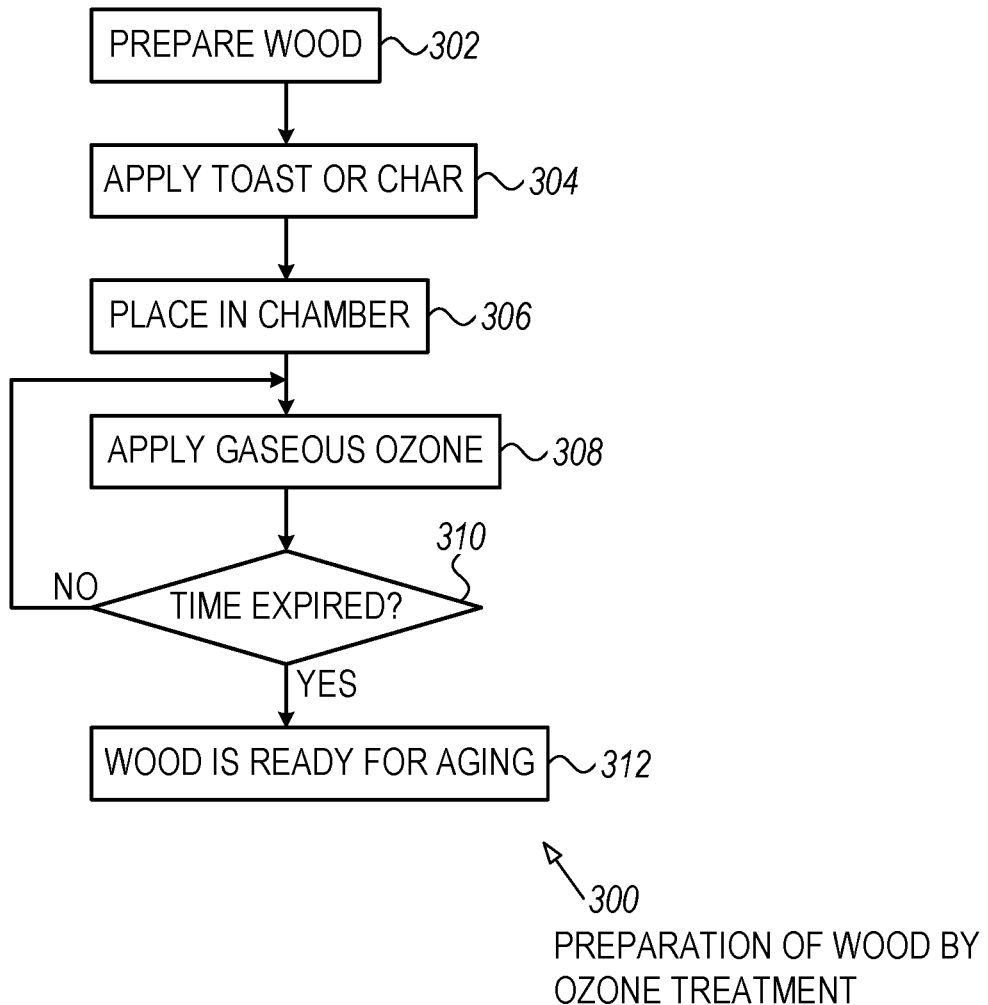
FIG. 3 is a flowchart illustration of an embodiment showing a method for processing wood pieces prior to artificial aging.

FIG. 3 is a flowchart illustration of an embodiment 300 showing a method for pretreating wood pieces prior to contact with alcohol spirits.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method for pretreating wood pieces with ozone. It is believed that ozone speeds up the oxidation process of the wood, causing tannins, lignin, and other compounds in the wood to become more available for incorporation and reaction into alcohol spirits. The ozone treatment may accelerate some of the otherwise naturally occurring processes that may take years to accomplish through barrel aging of alcohol spirits.

Wood may be prepared in block 302. The wood used for aging spirits may be of any variety. Virgin American white oak is traditionally used for barrel staves in bourbon whiskey made in the US, while previously used barrels may be traditionally used for other types of spirits. Because the artificial aging process does not occur in barrels, certain varieties of woods may be used that may impart interesting flavors to the spirits. Examples of such wood varieties that may not lend themselves to barrel construction but may impart such flavors may be apple, cherry, walnut, hickory, and countless others.

The wood may be prepared in shape and size to fit the process equipment being used for artificial aging. For processing small amount of spirits, wood shavings or chips may be used. For processing larger amounts, sticks, planks, or logs may be used.

The wood may undergo toasting, charring, or otherwise receive some burning process in block 304. In some cases, heavy charring may cause charcoal to form on the outside of the wood surfaces. Some recipes may use a combination of charred or toasted wood pieces as well as some amount of untoasted or raw wood pieces, with each type of prepared wood giving off specific flavors or compounds that may contribute to the taste of the spirit.

The wood may be placed in a chamber in block 306, and may undergo gaseous ozone treatment in block 308. If the treatment time has not expired in block 310, the process may loop back to block 308. Once time has expired in block 310, the wood may be ready for aging.

Figure 4:
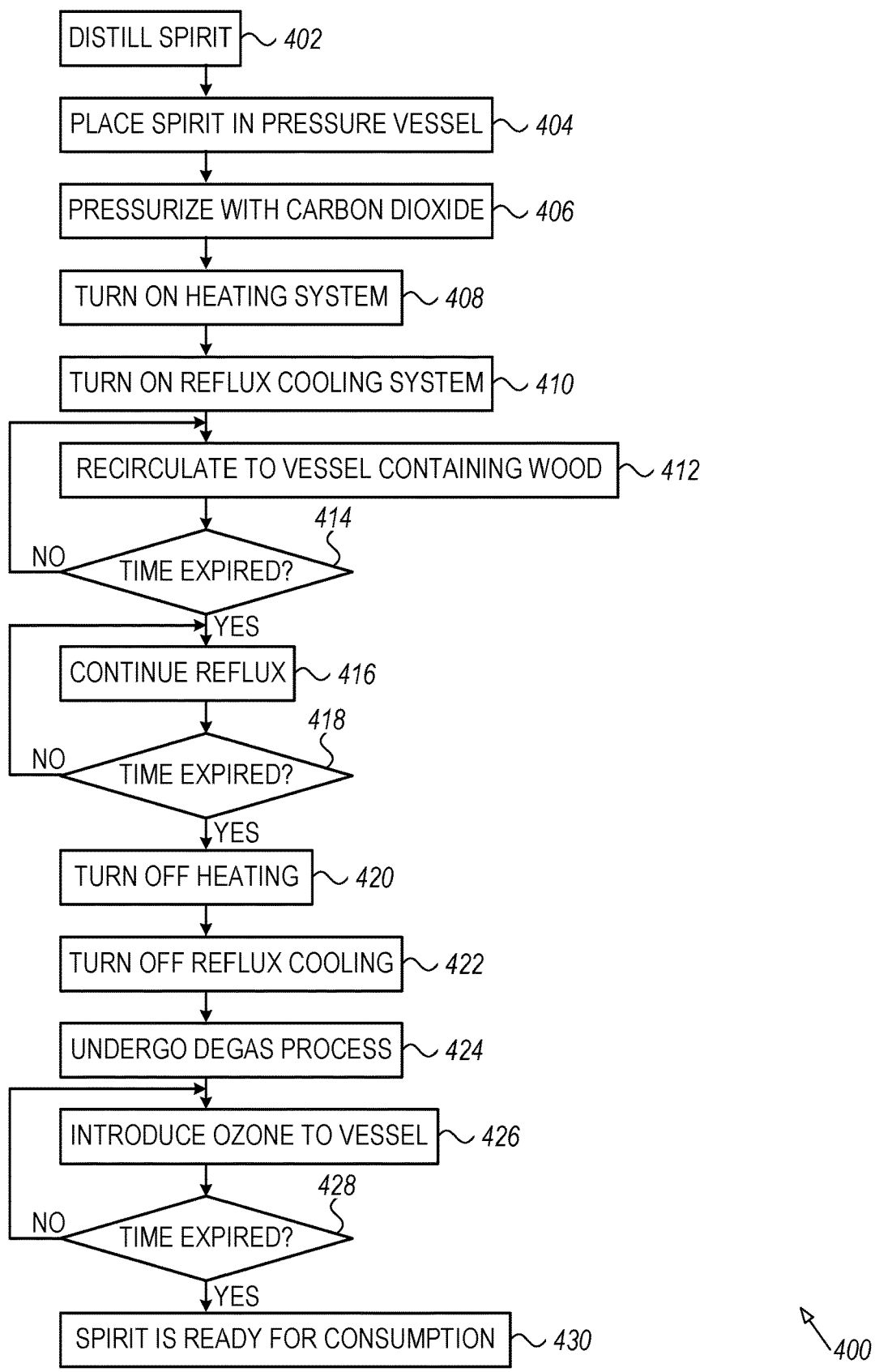
FIG. 4 is a flowchart illustration of an embodiment showing a method for artificial aging of alcohol spirits.

FIG. 4 is a flowchart illustration of an embodiment 400 showing a method for accelerated aging of alcohol spirits.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method for accelerated aging of alcohol spirits using pressurized carbon dioxide. The system may create a reflux environment with a heating component and a cooling component, which may cause alcohol to evaporate inside the pressurized vessel, then condense and reflux back into a liquid. In the example of embodiment 400, a separate vessel containing wood pieces is used to recirculate spirits in contact with the wood, then remove the wood from the aging process.

A spirit may be distilled in block 402. In many cases, raw distillate may be used, however, in other cases, previously aged alcohol spirits may be further processed using the accelerated aging process of embodiment 400.

The spirits may be placed in a pressure vessel in block 404, which may be pressurized with carbon dioxide in block 406. A heating system may be applied in block 408 to raise the temperature of the contents to at least a predefined temperature. The predefined temperature may be 80F, 90F, 100F, 110F, 120F, 130F, 140F, 150F, or higher. The pressurization may occur to at least 40 psi, 50 psi, 60 psi, 70 psi, 80 psi, 100 psi, 120 psi, 140 psi, 160 psi, or higher.

At each of the predefined temperatures and pressures, certain characteristics of the aging may be enhanced or minimized. Specific pressures and temperatures have been shown to cause different flavors, mouthfeel, and other tasting characteristics to be increased or decreased.

A reflux cooling system may be started in block 410 to create a reflux situation in the pressure vessel. In many cases, the pressure vessel may have a headspace such that vapor may form and condense, and therefore the pressure vessel may not be filled to capacity with liquid.

As the spirit is under carbon dioxide pressure and the reflux environment may be occurring, the spirit may be recirculated through a second vessel containing wood pieces. In many cases, such wood pieces may be those preprocessed with ozone, such as the process of embodiment 300.

The recirculation through the wood containing vessel may proceed for a predetermined time in block 414, with the process returning to block 412 until the predetermined time has expired in block 414. Once the time has expired in block 414, the recirculation through the wood containing vessel may stop and reflux within the pressure vessel may continue in block 416. The reflux may continue until a second predetermined time has expired in block 418, after which the heating may be turned off in block 420 as well as the reflux cooling in block 422.

The processing time for wood contact may be in the order of minutes, hours, days, or sometimes weeks. Similarly, the processing time for reflux without wood contact may be in the order of minutes, hours, days, or sometimes weeks. In many experiments, overall processing time may be a matter of single digit hours.

In general, higher pressures, higher temperatures, and more extensive pretreatment of wood with ozone may speed up the transfer of compounds into the alcohol spirits as well as accelerate the chemical reactions that may occur during aging. Because of the complexity of such reactions and processes, increased processing times may emphasize certain reactions over others, causing specific flavors to be enhanced. Some of such flavor characteristics may be desirable while other flavor characteristics may be undesirable.

An experienced practitioner may, through experimentation, find specific sets of processing parameters that may result in a specific recipe for a spirit.

After processing under pressurized carbon dioxide, the spirit may undergo a degas process in block 424. The spirit may have a large amount of dissolved carbon dioxide, which may be removed through ultrasonic agitation, mechanical agitation, vacuum assist, or some other mechanism.

After degassing, a treatment of ozone may be performed in block 426, which may proceed for a predetermined time in block 428. After ozone treatment, the spirit may be bottled and ready for consumption in block 430.

The ozone treatment of block 426 may cause some degree of oxidation to occur, which may further mellow the spirit and further enhance the reactions that may contribute to favorable flavors.

Figure 5:
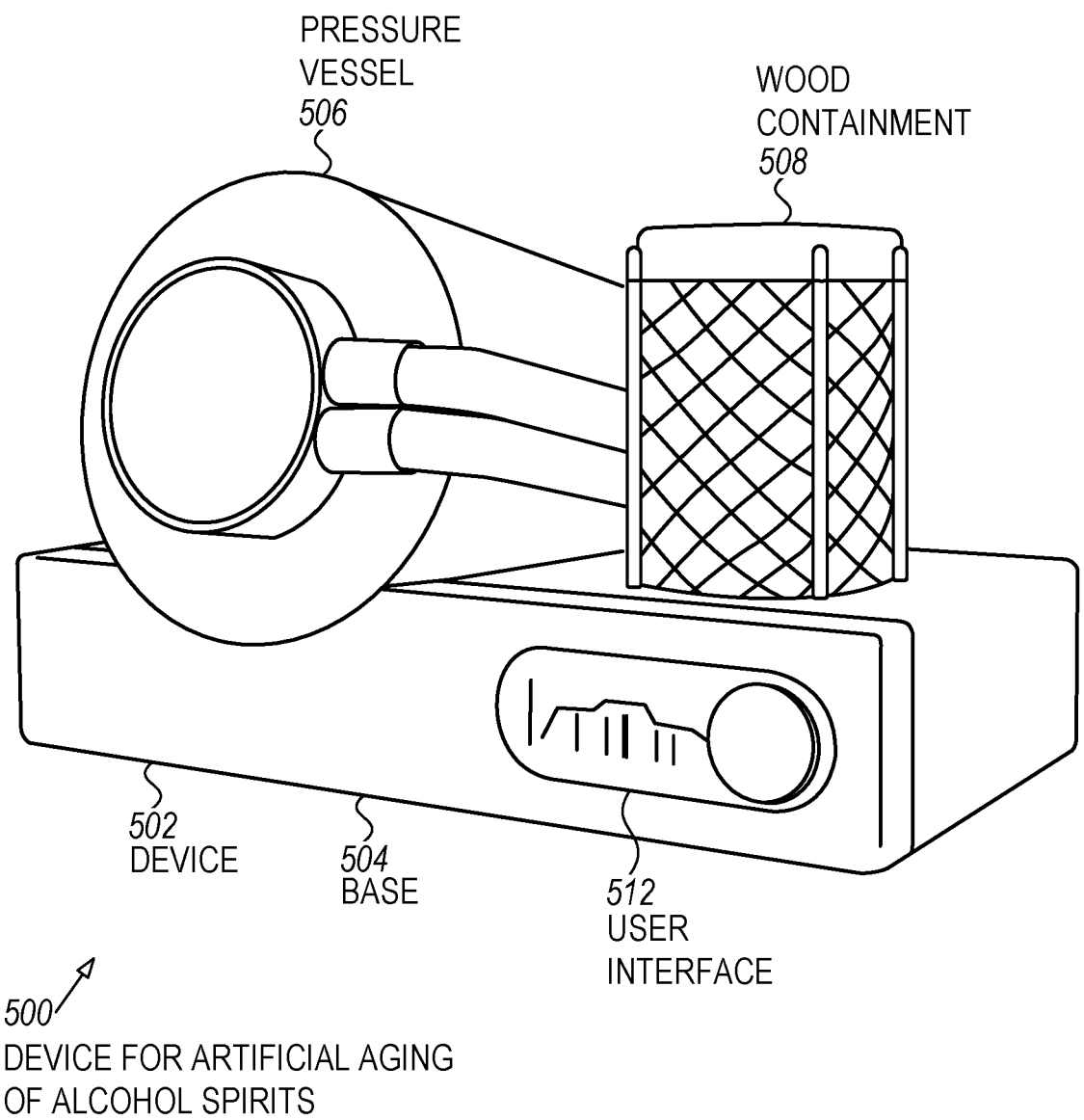
FIG. 5 is a diagram illustration of an embodiment showing a table top machine for artificial aging of alcohol spirits.

FIG. 5 is a diagram illustration of an embodiment 500 showing a table top version of a device for artificially aging alcohol spirits. The device 502 may have a base 504, to which a pressure vessel 506 may be attached. A separate wood containment vessel 508 may have wood chips or shavings. The device 502 may have an ozone generator as well as a user interface 512. Not shown in the device may be a carbon dioxide system, which may use pressurized cartridges of carbon dioxide as the pressurization source.

The device 502 may be operated by placing an amount of alcohol spirits into the pressure vessel 506 and attaching the vessel to the base 504. An operator may add wood pieces to the wood containment vessel 506, which may also be attached to the base 504.

In some systems, the ozone generator may preprocess the wood in the wood containment vessel 508 by applying gaseous ozone to the wood chips prior to processing the alcohol spirits.

The alcohol spirits may be processed by pressurizing the pressure vessel with carbon dioxide. The pressure vessel may have a heating element on the surface of the vessel or mounted internally to the vessel. In the design of the device 502, the reflux cooling apparatus may be a passively cooled upper portion of the pressure vessel, as opposed to a fan or other active cooling mechanism.

The wood containment vessel 508 may be pressurized to the same pressure as the pressure vessel 506, and a recirculating pump or other device may recirculate alcohol spirits through the wood containment vessel 508.

An internal controller may turn on and off various valves, pumps, or other components to automatically cause the artificial aging process to occur. In many cases, such a controller may also have various sensors, such as pressure monitors, temperature monitors, attachment sensors, locks, or other components to monitor the status of the process and make adjustments to control parameters.

The internal recirculation system may process alcohol through the wood containment vessel 508 for a period of time, and may turn off the recirculation process after a predetermined time. In some cases, the wood containment vessel 508 may be purged of alcohol spirits at the end of such recirculation.

In some cases, the reflux process may continue without recirculation through the wood containment vessel 508.

After processing, the pressure vessel 506 may be vented and degassed. The ozone generator may supply gaseous ozone, which may be introduced into the pressure vessel 506 for final treatment. After such processing, the pressure vessel 506 may be removed and the artificially aged alcohol spirits may be bottled or otherwise consumed.

Figure 6:
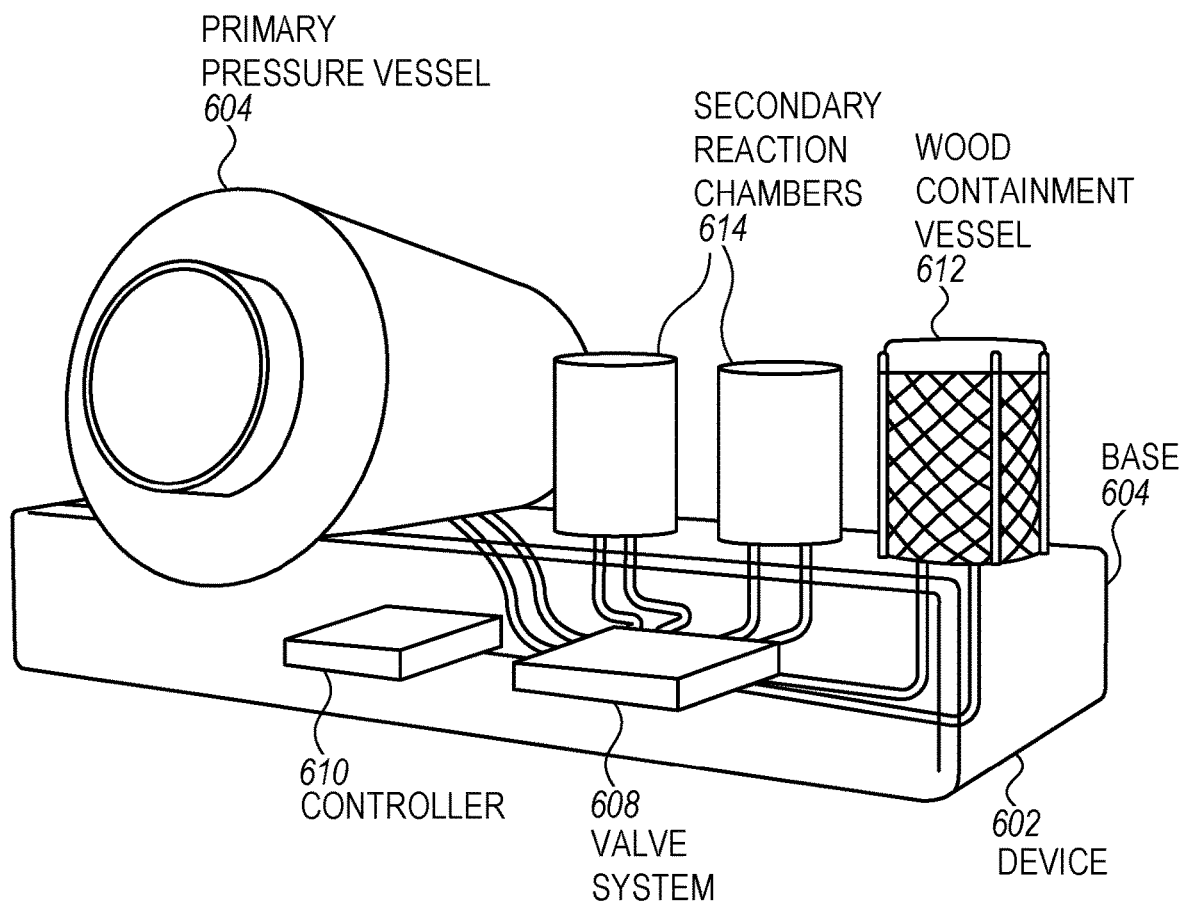
FIG. 6 is a schematic illustration of an embodiment showing a table top machine for artificial aging of alcohol spirits.

FIG. 6 is a schematic illustration of an embodiment 600 showing a device for artificial aging of alcohol spirits. Embodiment 600 may illustrate a similar device as embodiment 500, but with an addition of two secondary reaction chambers.

The device 602 has a base 604, along with a primary pressure vessel 606. A valve system 608 may be controlled by a controller 610, which may cause different valves to open to configure the device 602 to perform various steps of an accelerated aging process.

The valve system 608 may direct pressurized or unpressurized spirits through several different reaction chambers. One such reaction chamber may be a wood containment vessel 612, however other secondary reaction chambers 614 may also be used. The various reaction chambers may be able to be added or removed from circulating alcohol spirits during processing.

Some systems may include multiple reaction chambers, which may be loaded with different types of flavor components. For example, spices, grains, sweeteners, bittering agents, or any other type of component may be added to a reaction chamber and used to impart flavor to a spirit being processed.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a base;
   a pressure vessel;
   a carbon dioxide pressurization source;
   a heating mechanism;
   at least one processor;
   wherein said at least one processor is configured to:
      detect that said pressure vessel is attached to said base, said pressure vessel containing unprocessed alcohol spirits;
      cause said carbon dioxide pressurization source to pressurize said pressure vessel with carbon dioxide;
      cause said heating mechanism to heat said alcohol spirits in said pressure vessel while pressure with said carbon dioxide;
      hold said pressure vessel at pressure for a first predetermined time; and
      after said first predetermined time, release said carbon dioxide under pressure;
   a wood containment vessel;
   a recirculator connected to said pressure vessel and said wood containment vessel, said recirculator comprising a pump and at least one valve;
   said at least one processor further configured to:
      detect that said wood containment vessel is attached to said base, said wood containment vessel containing wood pieces;
      during said hold of said pressure vessel at said pressure, cause said recirculator to recirculate said alcohol spirits through said wood containment vessel for a second predetermined time, said second predetermined period of time being as long as or less than said first predetermined time; and cause an ozone generator to introduce ozone into said wood containment vessel prior to said causing said alcohol spirits to recirculate through said wood containment vessel.

2. The system of claim 1, said carbon dioxide being pressurized in said pressure vessel to at least 30 psi.

3. The system of claim 2, said carbon dioxide being pressurized in said pressure vessel to at least one of the following group of pressures: 40 psi, 50 psi, 60 psi, 70 psi, 80 psi, 100 psi, 120 psi, 140 psi, and 160 psi.

4. The system of claim 2, said heating mechanism causing said alcohol spirits to be heated to at least 80F.

5. The system of claim 4, said heating mechanism causing said alcohol spirits to be heated to at least one of the following group of temperatures: 90F, 100F, 110F, 120F, 130F, 140F, and 150F.

6. The system of claim 4 further comprising a cooling mechanism configured to cool a top portion of said pressure vessel, said at least one processor further configured to:

cause said cooling mechanism to operate while said heating mechanism is operating.

7. The system of claim 4, said first predetermined time being at least 5 minutes.

8. The system of claim 1, said first predetermined time being longer than said second predetermined time.

9. The system of claim 8, said first predetermined time being at least 30 minutes, and said second predetermined time being at least 15 minutes.

10. The system of claim 1, said at least one processor further configured to:

cause said ozone generator to introduce ozone into said pressure vessel after said releasing said carbon dioxide under pressure.

* * * * *